Inventor:
Philip T. Liggett
By: Lee J. Gary
Attorney.

July 3, 1951 P. T. LIGGETT 2,558,861
APPARATUS FOR PRODUCTION OF ACETYLENE AND OTHER HYDROCARBONS
Filed April 30, 1945 2 Sheets-Sheet 2

Inventor:
Philip T. Liggett
By: Lee J. Gary
Attorney

Patented July 3, 1951

2,558,861

UNITED STATES PATENT OFFICE 2,558,861

APPARATUS FOR PRODUCTION OF ACETYLENE AND OTHER HYDROCARBONS

Philip T. Liggett, Harvey, Ill., assignor to Universal Oil Products Company, Chicago, Ill., a corporation of Delaware Application April 30, 1945, Serial No. 591,037

2 Claims. (Cl. 23—288)

1

This invention relates to an improved method and apparatus for the continuous high temperature pyrolysis of hydrocarbons to form acetylene and other products. It is in general known that petroleum hydrocarbons when subjected to pyrolysis form acetylene, unsaturates, and aromatics. Also, the largest yields of acetylene and minimum decomposition to hydrogen and carbon appear to be attained with a very high temperature, short time contact and by the use of a diluent, such as steam, $CO_2$, or hydrogen.

The principal object of this invention is to provide a simple, direct and continuous means for the pyrolytic conversion of petroleum hydrocarbons to acetylene and unsaturates. Another object is to provide a compact apparatus and arrangement of equipment for accomplishing this continuous conversion process. The continuous pyrolysis is to be accomplished by passing a hydrocarbon gas such as methane, ethane, ethylene, propane, propylene, butane and other higher hydrocarbons, or mixtures thereof, through a continuously revolving heat transfer bed or grill work of refractory material. This refractory bed is preferably circular or ring-shaped and is provided with a rotating supporting means such that it may continuously revolve through a heating zone and a pyrolysis or conversion zone. The bed should be of a refractory material suitable for use at a temperature in the range of 1800° to 3000° F. For this purpose carborundum, Alundum or zirconium are acceptable materials but other material capable of withstanding this high temperature may also be used. The refractory is heated by placing a plurality of burners below the revolving bed in the heating zone of the unit, the combustion gases thus travel up through the porous bed and out a flue gas exit. In the other portion of the unit or the pyrolysis zone, which is separated from the heating zone, the hydrocarbon gas or gases may flow either upward or downward through the revolving bed, however preferably upward, to become converted to acetylene and other pyrolysis products in contact with the high temperature bed. There is a particular advantage to the circular bed and the circular housing in that the heating and processing zones can be proportioned to give the optimum conversion. The major portion of the unit may be heating zone, where high temperature is required and the thickness of the bed may be varied to achieve variation in the contact time. Also, the rate of turning the bed and the rate of hydrocarbon gas flow can be varied to give further

2 process control. A novel method of injecting steam or other diluent gas into the conversion chamber is provided, being fed in, such that cross-flow or mixing of the gas streams between the heating and conversion zones is prevented. Natural petroleum gas or various hydrocarbon gases such as mentioned above may be used to produce good yields of acetylene in the high temperature range from 1800° to 3000° F.; however, lower temperature pyrolysis may be carried out to obtain principally olefins and other unsaturates.

A similar apparatus employing catalyst in the annular shaped bed may be used in other conversion processes such as the catalytic cracking of hydrocarbons or the catalytic conversion of butanes to butenes. For such catalytic conversion processes, the pyrolysis zone would become the reaction zone and the heating zone would become the regenerating zone for the catalyst bed.

There are at present various methods for the pyrolysis of hydrocarbon gases to acetylene; however, most of the present methods make use of externally heated tubes or fixed type of regenerative heating means, having heat absorbing grill work or refractory contact masses. This latter type of regenerative heater or furnace results in a cyclic process, or the need of elaborate switching means between two or more chambers to give a continuous process. The continuous revolving annular shaped refractory bed of the present invention has the advantage of being heated and of being used for pyrolytic conversion at the same time, thus providing a simple continuous manufacturing process. The electrical arc or the electrical resistance methods of acetylene production which have been used are of the continuous type, however, these methods are high in operating costs unless a cheap source of electrical energy is available.

The pyrolytic conversion of a hydrocarbon gas by the method of this invention comprises passing a hydrocarbon gas to be converted, preferably preheated, in a continuous flow stream through a continuously revolving annular porous bed or grill work of a high temperature refractory, which is heated to a temperature above 1800° F. The annular heat transfer bed is revolved by a central power driven shaft, having provision for varying the rotating speed. A housing suitable for high temperatures encloses the ring-shaped bed, and is divided into a heating zone and a process zone. The heating zone has a plurality of burners placed below the bed such that it receives direct heat from the burners, the combustion and flue gases pass through the bed and are collected in a breeching above from which they pass to a flue gas outlet or stack. Ducts or conduits are provided connecting to the processing zone such that the preheated hydrocarbon stream may flow either way through the high temperature bed, but preferably upward, with the resultant products of the pyrolytic conversion being withdrawn from the top outlet duct or conduit. The apparatus is further provided with means to feed in a diluent gas stream around the vertical drive shaft, this stream being fed in under pressure serves to prevent cross-flow or mixing of gases between the zones. This stream not only provides cooling around the drive shaft but in addition bleeds into the conversion zone to give the desired effect of a diluent gas thus minimizing carbon formation.

The accompanying drawing and following description thereof will serve to show more fully the method of processing and one form of the apparatus for accomplishing the continuous method of conversion.

Figure 1:
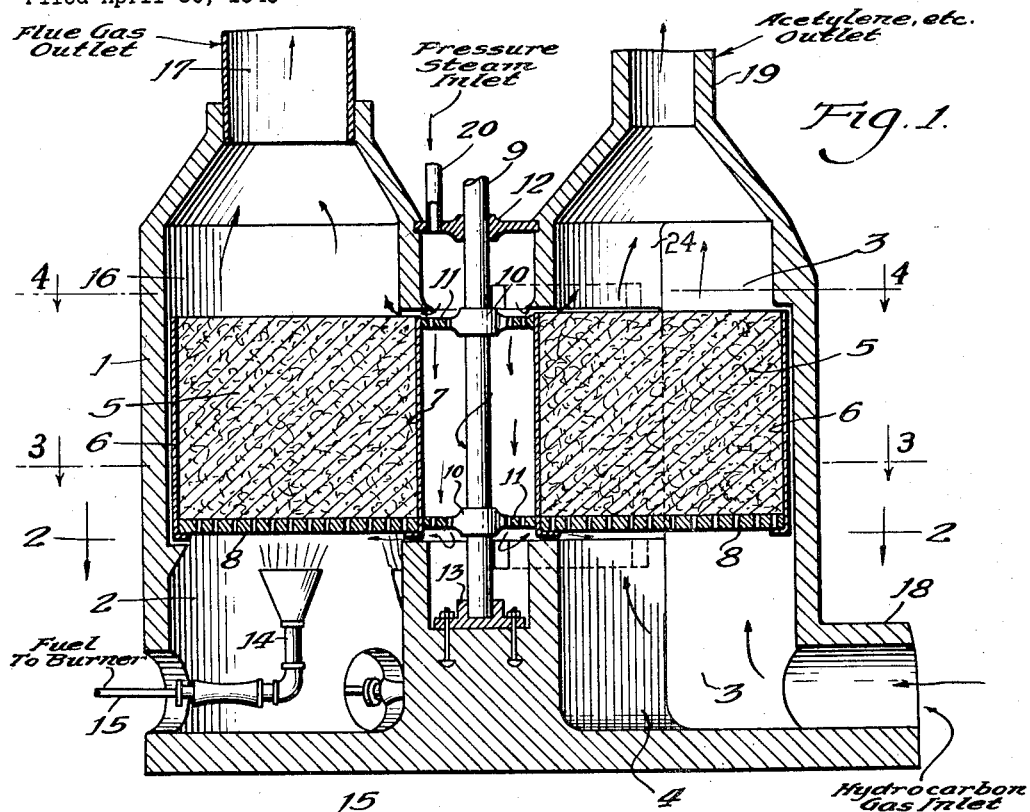
Figure 1 shows a sectional elevation view of the apparatus and the flow of the gases through the unit.
Figure 3:
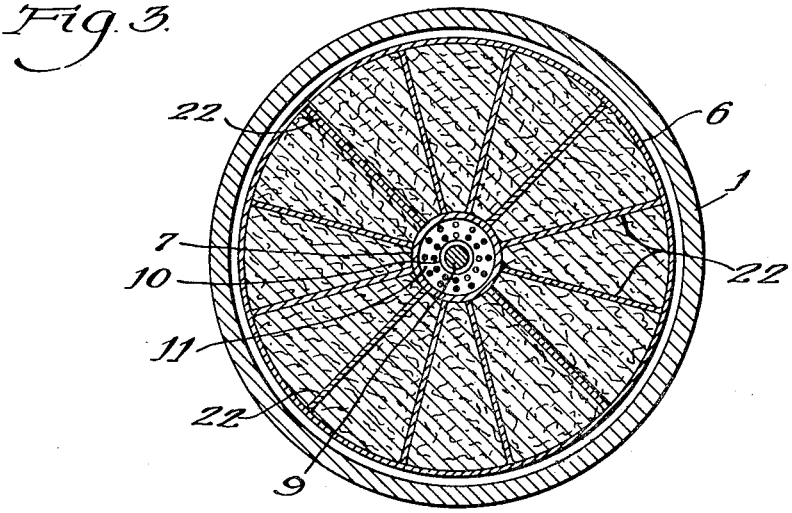
Figure 4:
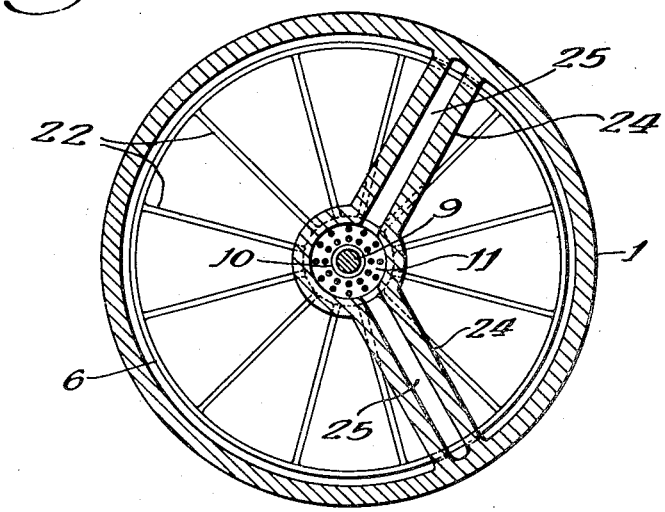

Figures 3 and 4 show additional sectional plan views through the body of the unit, as indicated by the broken lines 3—3 and 4—4 in Figure 1 of the drawing.

Referring now to Figure 1 of the drawing the circular chamber 1 serves to house the entire conversion unit. The interior of the chamber 1 is divided into two zones, the heating zone 2 and the pyrolysis zone 3, by means of specially constructed dividing walls provided within the unit.

The revolving heat transferring bed 5 is annular-shaped, having an outer wall 6, an inner wall 7, and a bottom 8. The latter may comprise either a perforated plate or a grating. The bed 5 may be of any high temperature refractory material, suitable for use at temperatures in the range of 1800° to 3000° F. Further, this bed 5 may be of packed refractory pieces or pellets or it may be built-up symmetrically in grid work from brick type shapes, care being taken that resistance to flow is minimized. The walls 6 and 7 and the bottom plate 8 may be of metal alloy or of cast refractory materials capable of withstanding the temperatures encountered. The bed 5 is rotated by means of a vertically positioned drive shaft 9, attached to the casing wall 7 by means of hubs 10 and spokes or perforated disc plates 11. The shaft 9 is held in position by an upper bearing 12 and a lower thrust bearing 13, and may be driven by a motor or any other desired means (not shown). Other mechanical means of supporting and rotating the bed may of course be used such as the use of rollers in an outer circumferential track, or the use of an outer gear ring mounted on small driving gears.

The heating zone 2 has one or more burners 14, (three being shown in the drawing) for furnishing the necessary heat to the heat transfer bed 5. Fuel is fed to each of the burners 14 by means of lines 15. The hot combustion and flue gases pass up through the continuously revolving bed 5, and into the flared section 16, which leads to the flue gas outlet or stack 17.

The hydrocarbon gas which is to be converted to acetylene in the pyrolysis zone 3 is charged to the unit through the lower inlet conduit 18, and flows directly through the revolving contact bed 5. The hydrocarbon gas flow may be either upward or downward through the revolving bed; however, the preferred upward flow is shown by the arrows in the drawing. The high temperature contact results in the conversion of the gas charged to acetylene and other unsaturated hydrocarbons, which may collect in the tapered portion above the zone 3 and be discharged from the unit by way of outlet conduit 19. In the production of acetylene from petroleum hydrocarbons, as previously noted it is advisable to use a gas such as steam, hydrogen, or $CO_2$ as a diluent to minimize carbon formation. In the particular form of apparatus illustrated, further benefits are derived from the diluent stream. The steam or $CO_2$ diluent, either of which may be used in this apparatus, is injected under a slight pressure through line 20 to an open zone maintained all the way down along the shaft 9. Thus, the diluent passes through perforated plates 11 down through the cylindrical zone, formed by the revolving bed inner wall 7, into the central opening around the lower end of the shaft 9 and into the open channels 21 within the top of the wall 4. The diluent gas will flow and escape along the edges of wall 4, below the bed 5 into both the heating zone 2 and the conversion zone 3, as well as above the revolving bed 5 along the upper separating wall 24. This method of bleeding-in or charging the diluent under pressure serves to cool the central shaft 9 and prevent any mixing or cross-flow of gas streams between the heating zone 2, and the pyrolysis zone 3.

Figure 2:
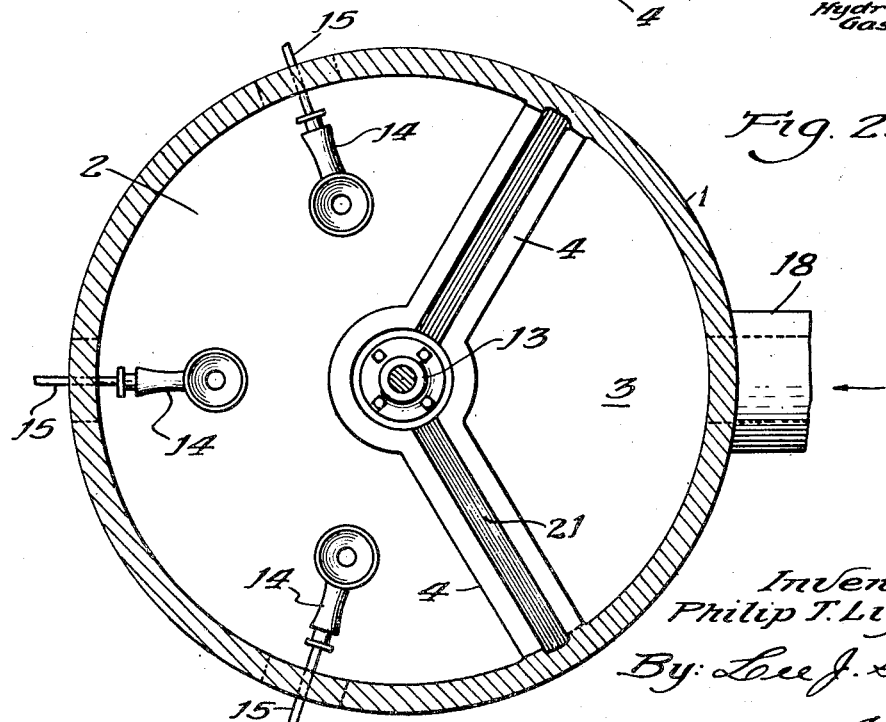
Figure 2 shows a sectional plan view of the lower portion of the apparatus as indicated by the line 2—2 shown in Figure 1 of the drawing.

In Figure 2 of the drawing is shown a plan view of the lower portion of the unit as indicated by line 2—2 in Figure 1. The various parts shown are numbered to be in accordance with markings as given in the elevational view, Figure 1.

Figure 3 of the drawing is a sectional plan view through the bed 5, showing suitable radial baffles or partitions 22 which serve to divide the contact bed into a plurality of smaller segmental sections. In Figure 4 of the drawing there is shown in section the upper dividing walls 24, which like the lower walls 4, have horizontal passageways or channels 25 suitable to conduct diluent gas from the confined zone surrounding the shaft 9. These horizontal upper channels 25, as well as the channels 21 in lower walls 4, provide means for effectively maintaining separate the gases present in the heating and conversion sections.

The pyrolysis of the methane, ethane, or whatever gas is used, will be continuous and direct by the contact method made available by this invention. The hydrocarbon gas which is to be converted, together with a diluent gas if found necessary, in addition to the central bleed-in diluent stream from line 20, is charged to the zone 3 through the large conduit 18. This inlet stream should preferably be preheated to obtain optimum acetylene production. The high temperature bed 5 is contacted briefly by the upflowing gas stream and results in the desired pyrolytic conversion, with the products being carried from the upper portion of the unit, above zone 3, by way of outlet conduit 19, to suitable gas separating equipment which is not illustrated.

The operation and construction of the unit is relatively simple and there are several variations which may be made to give the desired optimum operating conditions. The number and types of burners can be varied to give the desired temperature to the revolving bed, also the driving means for turning the bed may be made adjustable to give varying speeds. The thickness of the refractory bed 5 above the grid 8 may also be varied to suit conversion requirements, and still further the proportions of the size of the heating zone 2 with regard to the pyrolysis zone 3 can be changed by the placement of the dividing wall 4.

It is not intended to limit this continuous pyrolytic conversion process to the use of an apparatus just as shown, for obvious mechanical changes and substitutions may be made and still come within the broad scope of the invention.

A similar apparatus may be used to effect the catalytic conversion of hydrocarbons, a catalyst may be placed in the revolving annular bed 5, to provide a continuously moving bed. The catalyst bed would effect a conversion in one zone of the unit, and be regenerated in the other zone. In such a unit, the burners may be eliminated, and provision made for supplying an oxidizing gas stream in their place. Also, if desired or necessary, stripping and purging zones may be provided between the reaction and regeneration zones for the bed to revolve through.

I claim as my invention:

1. An apparatus for the pyrolytic conversion of a hydrocarbon gas stream which comprises in combination a circular heat retaining housing, vertically spaced walls dividing said housing into a heating section and a conversion section, an annular packed bed of heat retentive and high temperature resistant material, a rotatable container for said annular bed having cylindrical inner and outer walls, a plurality of vertical partitioning plates, and a perforated bottom plate mounted for rotation in the space between said dividing walls, a vertically positioned continuously driven supporting shaft attached to and extending through the center of said rotatable container, burner means for said heating zone, flue gas outlet means from said heating section above said rotating annular bed, inlet and outlet connections to said conversion section such that said hydrocarbon gas stream flows transversely through said continuously rotating bed, a vertical flow channel and a gas inlet thereto for a diluent gas stream around said driven vertical supporting shaft, gas distributing channels in said dividing walls connecting with said vertical flow channel around said shaft, said channels extending laterally in the surfaces of said dividing walls adjacent to and facing said rotatable container for said packed bed, whereby said diluent gas is distributed between said heating and conversion sections.

2. A conversion apparatus comprising a cylindrical housing, vertically spaced partitioning means forming a heating section and a conversion section within said housing, a segmentally divided annular container for refractory material mounted for rotation in the space between said partitioning means, and having cylindrical inner and outer walls and a perforated bottom member, a vertical drive shaft for said container extending through the cylindrical space formed by said inner wall, means for supplying a diluent gas to said cylindrical space, gas passageway means in the surfaces of said vertically spaced partitioning means facing said annular container, said passageways connective with said cylindrical space for introducing diluent gas to said heating and conversion sections, and inlet and outlet connections for both the heating and conversion sections on opposite sides of said container.

PHILIP T. LIGGETT.

REFERENCES CITED

The following references are of record in the file of this patent:

UNITED STATES PATENTS

| Number | Name | Date |
|---|---|---|
| 1,351,859 | Lowe et al. | Sept. 7, 1920 |
| 2,304,397 | Campbell | Dec. 8, 1942 |
| 2,318,688 | Hasche et al. | May 11, 1943 |
| 2,319,679 | Hasche et al. | May 18, 1943 |
| 2,337,956 | Yerrick et al. | Dec. 28, 1943 |

FOREIGN PATENTS

| Number | Country | Date |
|---|---|---|
| 440,432 | Great Britain | Dec. 30, 1935 |